United States Patent
Uno

(10) Patent No.: US 9,966,844 B2
(45) Date of Patent: May 8, 2018

(54) SWITCHING POWER SUPPLY APPARATUS

(71) Applicant: Murata Manufacturing Co., Ltd., Nagaokakyo-shi, Kyoto-fu (JP)

(72) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days. days.

(21) Appl. No.: 15/396,848

(22) Filed: Jan. 3, 2017

(65) Prior Publication Data
US 2017/0149333 A1 May 25, 2017

Related U.S. Application Data

(63) Continuation of application No. PCT/JP2015/065183, filed on May 27, 2015.

(30) Foreign Application Priority Data

Aug. 5, 2014 (JP) ................................. 2014-159118

(51) Int. Cl.
*H02M 3/156* (2006.01)
(52) U.S. Cl.
CPC .................... *H02M 3/156* (2013.01)
(58) Field of Classification Search
CPC .... H02M 3/156; H02M 3/158; H02M 3/1584; H02M 3/1588; Y02B 70/1466
See application file for complete search history.

(56) References Cited

U.S. PATENT DOCUMENTS

2009/0243575 A1  10/2009  Akiyama et al.
2012/0236612 A1   9/2012  Uno

FOREIGN PATENT DOCUMENTS

| JP | 08-123560 A | 5/1996 |
| JP | 2009-100496 A | 5/2009 |
| JP | 2009-240063 A | 10/2009 |
| JP | 2009-277076 A | 11/2009 |
| JP | 2010-274175 A | 12/2010 |
| JP | 2013-078203 A | 4/2013 |
| WO | 2010/109694 A1 | 9/2010 |

OTHER PUBLICATIONS

Official Communication issued in corresponding International Application PCT/JP2015/065183, dated Sep. 1, 2015.

*Primary Examiner* — Nguyen Tran
*Assistant Examiner* — Monica Mata
(74) *Attorney, Agent, or Firm* — Keating & Bennett, LLP

(57) ABSTRACT

A switching power supply apparatus includes a step-down converter that steps down an input current by turning on/off switching elements, a switching element electrically connected between the step-down converter and voltage outputs, and a microcontroller. An input-side resistor voltage dividing circuit and an output-side resistor voltage dividing circuit including elements with the same or similar specifications are electrically connected to the input and output of the switching element, respectively. The microcontroller stores coefficients of an expression which have been externally calculated according to a voltage detected by the output-side resistor voltage dividing circuit and a voltage detected at the voltage output portions. The microcontroller corrects a measurement value of an intermediate bus voltage detected by the input-side resistor voltage dividing circuit according to an expression and the stored coefficients.

20 Claims, 7 Drawing Sheets

SWITCHING POWER SUPPLY APPARATUS

CROSS REFERENCE TO RELATED APPLICATIONS

This application claims the benefit of priority to Japanese Patent Application No. 2014-159118 filed on Aug. 5, 2014 and is a Continuation Application of PCT Application No. PCT/JP2015/065183 filed on May 27, 2015. The entire contents of each application are hereby incorporated herein by reference.

BACKGROUND OF THE INVENTION

1. Field of the Invention

The present invention relates to a switching power supply apparatus including a converter.

2. Description of the Related Art

In a switching power supply including a converter, the voltage and current of the converter are measured for the detection of an abnormality or an operating state. An error or deviation in an output voltage caused by variations in resistance of wiring and a reference voltage is stored in a storage device at the time of factory shipment for the purpose of correcting such an error or deviation.

For example, Japanese Unexamined Patent Application Publication No. 2013-78203 discloses a power supply failure detection circuit that detects the abnormality of a power supply formed of a DC-DC converter and prevents the output of an input voltage directly to the side of a load at the time of detection of abnormality. As disclosed in Japanese Unexamined Patent Application Publication No. 2013-78203, a sign of failure of a switching element is detected on the basis of an input current flowing into the switching element connected in series to an output line to the side of the load and a voltage across the switching element. Japanese Unexamined Patent Application Publication No. 2009-100496 discloses a power supply device that stores in an EEPROM a threshold value calculated on the basis of the voltage of a load detected at the time of factory shipment and compares the threshold value with the voltage of a load to detect an abnormality on the side of the load with high accuracy.

However, a measurement terminal for externally measuring a voltage is not usually provided in the middle of a circuit. It is therefore not possible to directly measure a voltage across a switching element and correct a voltage value as disclosed in Japanese Unexamined Patent Application Publication No. 2013-78203. In order to detect a voltage across the switching element and correct a voltage value, it is necessary to additionally provide a detection terminal. In this case, the number of components is increased. This leads to an increase in the size of an apparatus.

The voltage of a load measured at the time of factory shipment is obtained as a value by measurement with high accuracy. Even in a case where the correction method disclosed in Japanese Unexamined Patent Application Publication No. 2009-100496 is used, a measurement terminal for externally measuring a voltage is therefore needed in the middle of a circuit.

SUMMARY OF THE INVENTION

Preferred embodiments of the present invention provide a switching power supply apparatus that detects a voltage in a middle of a circuit and corrects a measurement result without including a voltage detection terminal.

A switching power supply apparatus according to a preferred embodiment of the present invention includes a converter that converts an input voltage input to a voltage input portion into a predetermined voltage by turning a switching element on and off, a first semiconductor device with switching characteristics which is electrically connected in series to an input side or an output side of the converter, a first voltage detection circuit that detects a first voltage at a first end of the first semiconductor device electrically connected to the converter, a second voltage detection circuit that detects a second voltage at a second end of the first semiconductor device, a sampling circuit that compares a detection signal detected by each of the first voltage detection circuit and the second voltage detection circuit with a reference voltage, a voltage calculation processor that calculates a measurement value of each of the first voltage and the second voltage according to voltage data generated by the sampling circuit in a predetermined expression, a memory that stores a coefficient of the expression, and a communication circuit that transmits a measurement value of each of the first voltage and the second voltage calculated by the voltage calculation processor to an external apparatus and receives the coefficient from the external apparatus. The first voltage detection circuit and the second voltage detection circuit include the same or similar arrangements and include elements with the same or similar specifications. The sampling circuit applies the same or substantially the same reference voltage to sample detection signals detected by the first voltage detection circuit and the second voltage detection circuit. The same or similar expression is applied to calculate of measurement values of the first voltage and the second voltage and the same or substantially the same coefficient is included in the expression.

According to the configuration described above, detection results of voltages (i.e., the first voltage and the second voltage) at both ends of the first semiconductor device connected to the converter include errors caused by each element in the detection circuits. However, the difference between the errors is not present or is negligible. It is therefore possible to calculate measurement values of the voltages at both the ends in the same or similar manner to significantly reduce or prevent the influence of the errors. If the first semiconductor device is connected to an input side of the converter, the voltage of an input terminal of the switching power supply apparatus may be directly measured to obtain the second voltage of the first semiconductor device. If the first semiconductor device is connected to an output side of the converter, the voltage of an output terminal of the switching power supply apparatus may be directly measured to obtain the second voltage of the first semiconductor device.

Coefficients included in an expression used to calculate a measurement value from a detection signal obtained by a detection circuit are calculated and stored. Accordingly, the directly measured input voltage (or output voltage) measurement value and a measurement value obtained from the second voltage detected by the detection circuit correspond to each other. By including the coefficients in an expression used to calculate a first voltage measurement value from a detection signal obtained by the detection circuit electrically connected between the first semiconductor device and the converter, a first voltage measurement value including no error or a negligible error is able to be calculated. Therefore, a measurement value of the first voltage is able to be corrected without a measurement terminal that directly measures the first voltage. As a result, a small-sized high-efficiency switching power supply apparatus is able to be provided.

According to a preferred embodiment of the present invention, the first voltage detection circuit and the second voltage detection circuit are resistor voltage dividing circuits. In this case, the first voltage and the second voltage are able to be detected with a simple configuration.

According to a preferred embodiment of the present invention, respective resistance elements in the resistor voltage dividing circuits have the same manufacturing lot number. With this configuration, variations in detection result caused by the influence of each element in a detection circuit are able to be further reduced or prevented.

According to a preferred embodiment of the present invention, respective resistance elements in the resistor voltage dividing circuits are elements in a single thin-film network resistor. With this configuration, an error caused by each element in a detection circuit is able to be further reduced or prevented.

According to a preferred embodiment of the present invention, the first voltage detection circuit includes a first buffer at an output portion of the first voltage detection circuit. According to a preferred embodiment of the present invention, the second voltage detection circuit includes a second buffer at an output portion of the second voltage detection circuit. With this configuration, the reference voltage of a resistor voltage dividing circuit is able to be stably generated and the error of a voltage detection result is able to be reduced or prevented.

According to a preferred embodiment of the present invention, the first buffer and the second buffer are circuits including the same or similar arrangements and include operational amplifiers, and the operational amplifiers are provided in a single chip. With this configuration, an error caused by the influence of buffers is able to be significantly reduced or prevented.

According to a preferred embodiment of the present invention, the first semiconductor device is a MOS-FET. With this configuration, when a converter, for example, breaks down, it is possible to significantly reduce or prevent the output of an overvoltage from the switching power supply apparatus by turning off the MOS-FET.

According to a preferred embodiment of the present invention, the first semiconductor device is a diode. With this configuration, the backflow of a current from a battery is able to be significantly reduced or prevented, for example, if the battery is connected to a switching power supply apparatus in opposite polarity.

According to a preferred embodiment of the present invention, the switching power supply apparatus includes a second semiconductor device with switching characteristics which is electrically connected to the input side of the converter, a third voltage detection circuit that detects a third voltage at a first end of the second semiconductor device electrically connected to the converter, a fourth voltage detection circuit that detects a fourth voltage at a second end of the second semiconductor device, a sampling circuit that compares a detection signal detected by each of the third voltage detection circuit and the fourth voltage detection circuit with a reference voltage, a voltage calculation processor that calculates a measurement value of each of the third voltage and the fourth voltage according to voltage data generated by the sampling circuit in a predetermined expression, a memory that stores a coefficient of the expression, and a communication circuit that transmits a measurement value of each of the third voltage and the fourth voltage calculated by the voltage calculation processor to an external apparatus and receives the coefficient from the external apparatus. The first semiconductor device is electrically connected to the output side of the converter. The third voltage detection circuit and the fourth voltage detection circuit preferably include the same or similar arrangements and preferably include elements with the same or similar specifications, for example. The sampling circuit preferably applies the same or substantially the same reference voltage to sample detection signals detected by the third voltage detection circuit and the fourth voltage detection circuit, for example. The same or similar expression is preferably applied to calculate of measurement values of the third voltage and the fourth voltage and the same or substantially the same coefficient is included in the expression, for example.

With this configuration, a small-sized high-efficiency switching power supply apparatus that corrects measurement values of both the input voltage and the output voltage of a converter is provided.

According to a preferred embodiment of the present invention, the third voltage detection circuit and the fourth voltage detection circuit are resistor voltage dividing circuits. In this case, the third voltage and the fourth voltage are able to be detected with a simple configuration.

According to a preferred embodiment of the present invention, respective resistance elements in the resistor voltage dividing circuits have the same manufacturing lot number. With this configuration, variations in detection result caused by the influence of each element in a detection circuit are able to be further reduced or prevented.

According to a preferred embodiment of the present invention, respective resistance elements in the resistor voltage dividing circuits are elements in a single thin-film network resistor. With this configuration, an error caused by each element in a detection circuit is able to be further reduced or prevented.

According to a preferred embodiment of the present invention, the third voltage detection circuit includes a third buffer at an output portion of the third voltage detection circuit. According to a preferred embodiment of the present invention, the fourth voltage detection circuit includes a fourth buffer at an output portion of the fourth voltage detection circuit. With this configuration, the reference voltage of a resistor voltage dividing circuit is able to be stably generated and the error of a voltage detection result is able to be significantly reduced or prevented.

According to a preferred embodiment of the present invention, the third buffer and the fourth buffer are circuits including the same or similar arrangements and include operational amplifiers, and the operational amplifiers are provided in a single chip. With this configuration, an error caused by the influence of buffers is able to be significantly reduced or prevented.

According to a preferred embodiment of the present invention, the second semiconductor device is a MOS-FET. With this configuration, when a converter, for example, breaks down, it is possible to significantly reduce or prevent the output of an overvoltage from the switching power supply apparatus by turning off the MOS-FET.

According to a preferred embodiment of the present invention, the second semiconductor device is a diode. With this configuration, the backflow of a current from a battery is able to be significantly reduced or prevented, for example, if the battery is connected to a switching power supply apparatus in opposite polarity.

According to preferred embodiments of the present invention, without providing a measurement terminal in a middle of a circuit to directly measure a first voltage between a converter and a first semiconductor device, it is possible to correct the measurement value of the first voltage. As a result, a small-sized switching power supply apparatus that outputs a voltage with high accuracy is able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be clarified through description of specific preferred embodiments of the present invention with reference to the drawings.

It is to be noted that the preferred embodiments described in this specification are merely examples, and that the configurations in the preferred embodiments are able to be partly replaced or combined between different preferred embodiments.

First Preferred Embodiment

Figure 1:
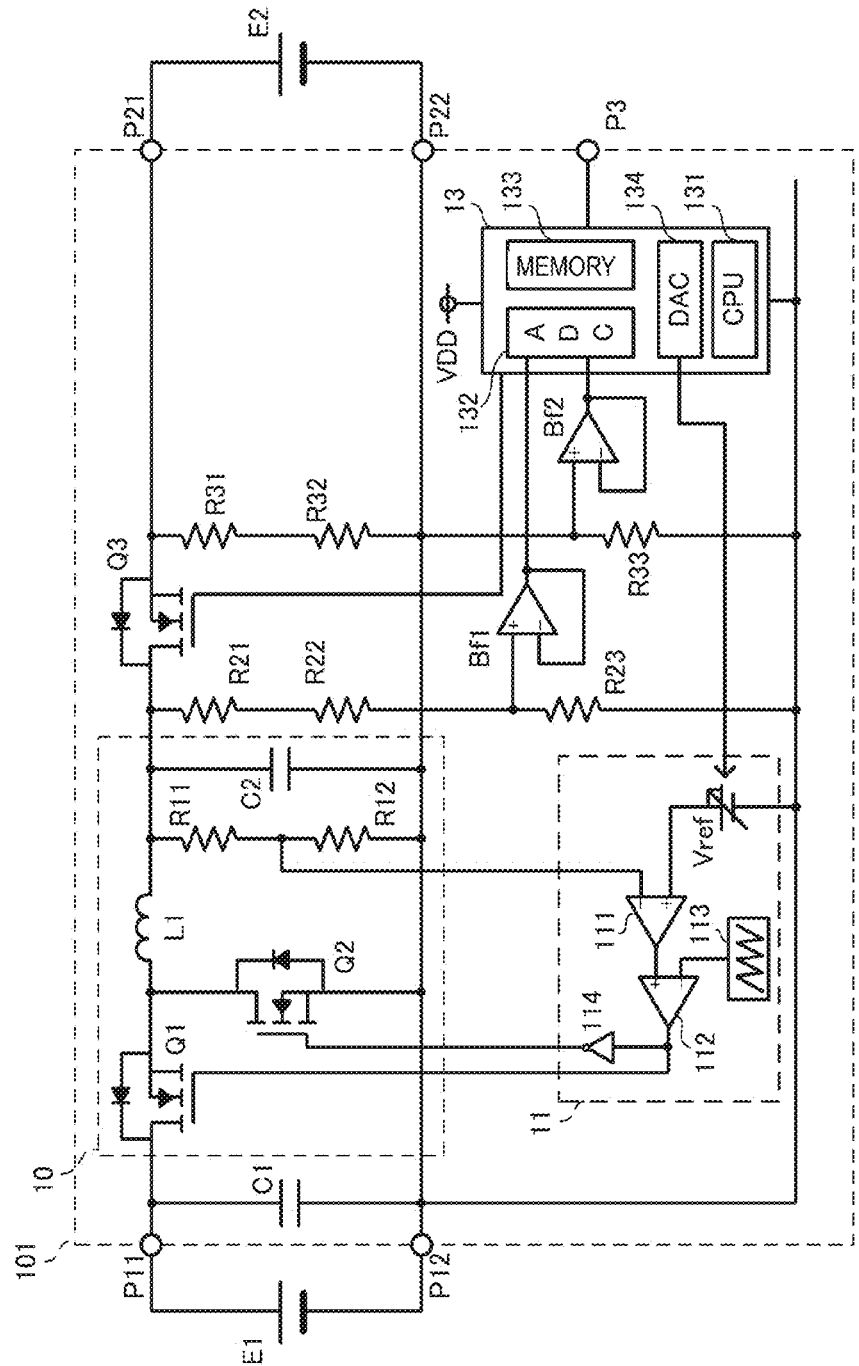
FIG. 1 is a circuit diagram of a switching power supply apparatus according to a first preferred embodiment of the present invention.

FIG. 1 is a circuit diagram of a switching power supply apparatus 101 according to a first preferred embodiment of the present invention.

A direct-current power supply E1 is electrically connected to voltage input portions P11 and P12 of the switching power supply apparatus 101. A battery E2 is electrically connected to voltage output portions P21 and P22 of the switching power supply apparatus 101. The switching power supply apparatus 101 steps down a direct-current voltage supplied from the direct-current power supply E1 and outputs a resultant voltage to the battery E2. The battery E2 is charged with the voltage.

A synchronous-rectification-type step-down converter 10 is electrically connected to the voltage input portions P11 and P12 via an input capacitor C1. The step-down converter 10 includes switching elements Q1 and Q2, an inductor L1, and a capacitor C2. The switching elements Q1 and Q2 are n-type MOS-FETs, and switching of the switching elements Q1 and Q2 is controlled by a gate signal from a control circuit 11, described below.

The switching power supply apparatus 101 includes a resistor voltage dividing circuit that detects an output voltage for feedback control of the step-down converter 10. The resistor voltage dividing circuit includes resistors R11 and R12. An output voltage detected by the resistor voltage dividing circuit is input into the control circuit 11.

The control circuit 11 includes a reference voltage Vref, an error amplifier 111, a comparator 112, and a triangular wave oscillator 113. The reference voltage Vref is input into a non-inverting input terminal (+) of the error amplifier 111, and a node between the resistors R11 and R12 is electrically connected to an inverting input terminal (−) of the error amplifier 111. The value of the reference voltage Vref is controlled by a microcontroller 13, described below. The error amplifier 111 amplifies an error of a voltage input into each input terminal and outputs a resultant voltage to a non-inverting input terminal (+) of the comparator 112.

The triangular wave oscillator 113 is electrically connected to an inverting input terminal (−) of the comparator 112. The comparator 112 compares a voltage output from the error amplifier 111 and a voltage output from the triangular wave oscillator 113 with each other and generates a pulse-width modulation (PWM) signal of a duty corresponding to a result of the comparison. The PWM signal generated by the comparator 112 is input into a gate of the switching element Q1. The PWM signal generated by the comparator 112 is inverted by an inverting circuit 114 and is then input into a gate of the switching element Q2.

The control circuit 11 performs switching control on the switching elements Q1 and Q2 according to a result of voltage detection performed by the resistor voltage dividing circuit. Accordingly, the output voltage of the step-down converter 10 has a predetermined value. For example, if a direct-current voltage is input from the direct-current power supply E1, the control circuit 11 performs switching control on the switching elements Q1 and Q2. Accordingly, a voltage output from the step-down converter 10 is constant or substantially constant, and the switching power supply apparatus 101 outputs a constant or substantially constant voltage.

A switching element Q3 is electrically connected to an output side of the step-down converter 10. The switching element Q3 is an n-type MOS-FET, and corresponds to a first semiconductor device. A drain of the switching element Q3 is electrically connected to the step-down converter 10, and a source of the switching element Q3 is electrically connected to the voltage output portion P21. The switching element Q3 defines and functions as a protective switch.

Switching of the switching element Q3 is controlled by the microcontroller 13. The microcontroller 13 turns off the switching element Q3 if a voltage detected by an input-side resistor voltage dividing circuit, described below, exceeds a threshold value. As a result, if a short circuit occurs between the drain and source of the switching element Q1 in the step-down converter 10 because of a failure or the like, the application of an overvoltage to the battery E2 is able to be significantly reduced or prevented. Even if the battery E2 is electrically connected to the voltage output portions P21 and P22 in opposite polarity by mistake, the backflow of a current from the battery E2 does not occur when the switching element Q3 is turned off because the body diode of the switching element Q3 is reverse biased.

The input-side resistor voltage dividing circuit and an output-side resistor voltage dividing circuit are provided on the input and output sides of the switching element Q3, respectively. The input-side resistor voltage dividing circuit corresponds to a first voltage detection circuit. The input-side resistor voltage dividing circuit includes resistors R21, R22, and R23, and detects an input voltage of the switching element Q3. The output-side resistor voltage dividing circuit corresponds to a second voltage detection circuit. The output-side resistor voltage dividing circuit includes resistors R31, R32, and R33, and detects an output voltage of the switching element Q3. The input voltage of the switching element Q3 is also an output voltage of the step-down converter 10, and is referred to as an intermediate bus voltage. The intermediate bus voltage corresponds to a first voltage, and the output voltage of the switching element Q3 corresponds to a second voltage.

The outputs of the input-side resistor voltage dividing circuit and the output-side resistor voltage dividing circuit are electrically connected to the microcontroller 13 via buffers Bf1 and Bf2, respectively, which are voltage follower circuits. The electrical connection of the buffers Bf1 and Bf2 to the outputs of the resistor voltage dividing circuits allows a reference signal of each resistor voltage dividing circuit to be stably supplied to the microcontroller 13.

The input-side resistor voltage dividing circuit and the output-side resistor voltage dividing circuit are circuits in which the same elements are electrically connected in the same or similar manner. More specifically, the resistors R21 and R31 are elements with the same or similar specifications, the resistors R22 and R32 are elements with the same or similar specifications, and the resistors R23 and R33 are elements with the same or similar specifications. The resistors R21, R22, and R23 are electrically connected in series, and the resistors R31, R32, and R33 are also electrically connected in series. The elements with the same or similar specifications indicates that the elements include the same or similar breakdown-voltage specifications and the same or similar product specifications, including an error tolerance range and a size, that is, the same product number, in addition to the same or substantially the same nominal resistance. The elements preferably have the same manufacturing lot number, for example. The resistors R21 and R31 are preferably elements in a single thin-film network resistor, the resistors R22 and R32 are preferably elements in a single thin-film network resistor, and the resistors R23 and R33 are preferably elements in a single thin-film network resistor to further reduce or prevent errors caused by respective elements in the detection circuits, for example.

Since the input-side resistor voltage dividing circuit and the output-side resistor voltage dividing circuit include the same or similar arrangements and include elements with the same or similar specifications, errors caused by the influences of the elements in results of voltage detection performed by the respective circuits are substantially the same or are negligible. Accordingly, if the voltage detection results including the errors are corrected, the same or substantially the same correction value is able to be applied to the input-side resistor voltage dividing circuit and the output-side resistor voltage dividing circuit. This correction is described below.

The microcontroller 13 operates with a controller drive power supply VDD and includes a central processing unit (CPU) 131, an analog-to-digital (AD) converter 132, a memory 133, and a digital-to-analog (DA) converter 134. The microcontroller 13 turns on/off the switching element Q3. The microcontroller 13 performs data communication with an external apparatus (not shown) via an external input/output portion P3. The CPU 131 corresponds to a voltage calculation processor.

The microcontroller 13 performs analog-to-digital conversion on a reference signal supplied from each of the input-side resistor voltage dividing circuit and the output-side resistor voltage dividing circuit by the AD converter 132 to detect an intermediate bus voltage and an output voltage. An output voltage obtained by analog-to-digital conversion performed by the AD converter 132 corresponds to voltage data. The AD converter 132 corresponds to sampling circuit. The microcontroller 13 may include a single AD converter or two AD converters.

Figure 2:
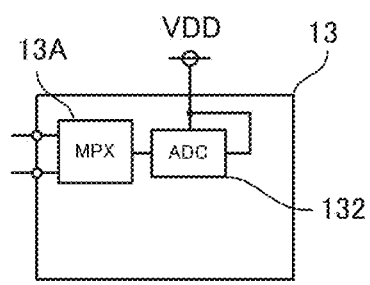
FIG. 2 is a diagram showing a microcontroller including a single AD converter.
Figure 3:
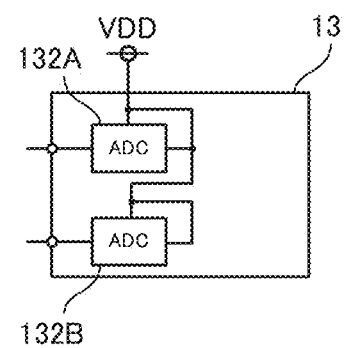
FIG. 3 is a diagram showing a microcontroller including two AD converters.

FIG. 2 shows a case where the microcontroller 13 includes a single AD converter. FIG. 3 shows a case where the microcontroller 13 includes two AD converters.

Referring to FIG. 2, the microcontroller 13 includes a multiplexer (MPX) 13A at a stage prior to the AD converter 132. One of reference signals from the input-side resistor voltage dividing circuit and the output-side resistor voltage dividing circuit is input into the AD converter 132. Referring to FIG. 3, the microcontroller 13 includes two AD converters 132A and 132B that are driven with the same or substantially the same reference voltage. The input-side resistor voltage dividing circuit and the output-side resistor voltage dividing circuit are electrically connected to the AD converters 132A and 132B, respectively. Each of the AD converters 132A and 132B compares an analog input signal with a plurality of reference voltages divided from the power supply voltage VDD by a plurality of comparators and converts an analog value into a digital value, according to a result of the comparison, by an encoder. In the first preferred embodiment, the controller drive power supply VDD is applied as a reference voltage for the AD converters. However, another reference voltage generation circuit may be provided and a voltage generated by this circuit may be applied as a reference voltage for the AD converters 132A and 132B.

The AD converters 132A and 132B shown in FIG. 3 correspond to sampling circuit.

The microcontroller 13 outputs output voltage data of the switching element Q3 detected by the output-side resistor voltage dividing circuit to an external apparatus via the external input/output portion P3. An external apparatus is, for example, an evaluation apparatus that evaluates the switching power supply apparatus 101 at the time of factory shipment. This external apparatus calculates coefficients of an expression used to correct a voltage measurement value detected by the microcontroller 13 in the switching power supply apparatus 101. The external apparatus performs the calculation of coefficients, for example, prior to factory shipment of the switching power supply apparatus 101. Correction according to coefficients is described below.

A measurement value of an intermediate bus voltage detected by the microcontroller 13 includes an error caused by the influence of each of the resistors R21, R22, and R23 in the input-side resistor voltage dividing circuit and an error caused by the reference voltage of the AD converter 132. The microcontroller 13 corrects the measurement value of an intermediate bus voltage.

If the coefficients are calculated, the intermediate bus voltage of the step-down converter 10 is directly measured to compare the measurement value of the intermediate bus voltage with a measurement value detected by the input-side resistor voltage dividing circuit. However, a measurement terminal is not usually provided in the middle of a circuit.

The intermediate bus voltage of the step-down converter 10 is not able to be directly measured. In the first preferred embodiment, an external apparatus measures the output voltage of the switching power supply apparatus 101 at the voltage output portions P21 and P22 and compares a measurement value of the output voltage with the output voltage of the switching element Q3 measured by the output-side resistor voltage dividing circuit. The external apparatus calculates the coefficients of an expression used to calculate the output voltage measurement value of the step-down converter 10.

As described above, the input-side resistor voltage dividing circuit and the output-side resistor voltage dividing circuit include the same or similar elements, the same or similar circuit configuration, and the same or substantially the same reference voltage of the AD converter 132. That is, a detection result of a signal from the input-side resistor voltage dividing circuit and a detection result of a signal from the output-side resistor voltage dividing circuit include errors caused by the influence of the same or similar elements. Accordingly, coefficients calculated for the output-side resistor voltage dividing circuit are able to also be applied to the input-side resistor voltage dividing circuit.

Upon detecting the output voltage of the switching element Q3 from the output-side resistor voltage dividing circuit, the microcontroller 13 calculates a corrected value of the output voltage according to y=ax+b, where x represents the value of the output voltage of the switching element Q3 and y represents the corrected value of the output voltage.

A division ratio of the resistors R31, R32, and R33 and the resolution of the AD converter 132 are predetermined. The output voltage of the switching power supply apparatus 101 measured by a high-accuracy measurement apparatus at the voltage output portions P21 and P22, that is, the output voltage of the switching element Q3, is input into an external apparatus. The voltage value measured by this measurement apparatus is represented by y in the above-described expression. The external apparatus compares the output voltage of the switching element Q3 measured by the measurement apparatus with the output voltage of the switching element Q3 detected by the output-side resistor voltage dividing circuit, and calculates coefficients a and b in the above-described expression according to a result of the comparison and predetermined values. The external apparatus outputs the calculated coefficients a and b to the microcontroller 13 in the switching power supply apparatus 101.

The microcontroller 13 stores the correction values a and b input from the external apparatus in the memory 133. The storage of the correction values a and b in the memory 133 provides a high-accuracy acquisition of measurement values of an output voltage and an intermediate bus voltage even after factory shipment.

As described above, the switching power supply apparatus 101 according to the first preferred embodiment is able to correct an error of a measurement value of an intermediate bus voltage without including a measurement terminal that directly measures an intermediate bus voltage.

The buffers Bf1 and Bf2 included in the first preferred embodiment do not necessarily have to be provided. However, by providing the buffers Bf1 and Bf2 that increase an input impedance, it is possible to significantly reduce or prevent a circuit provided at a stage prior to the AD converter 132 from affecting the division ratio of the resistor voltage dividing circuits. Therefore, the microcontroller 13 is able to obtain a detection result with higher accuracy. If the buffers Bf1 and Bf2 are provided, they are preferably operational amplifiers in a single IC chip that significantly reduce or prevent variations in error caused by the influence of the buffers Bf1 and Bf2, for example.

Second Preferred Embodiment

Figure 4:
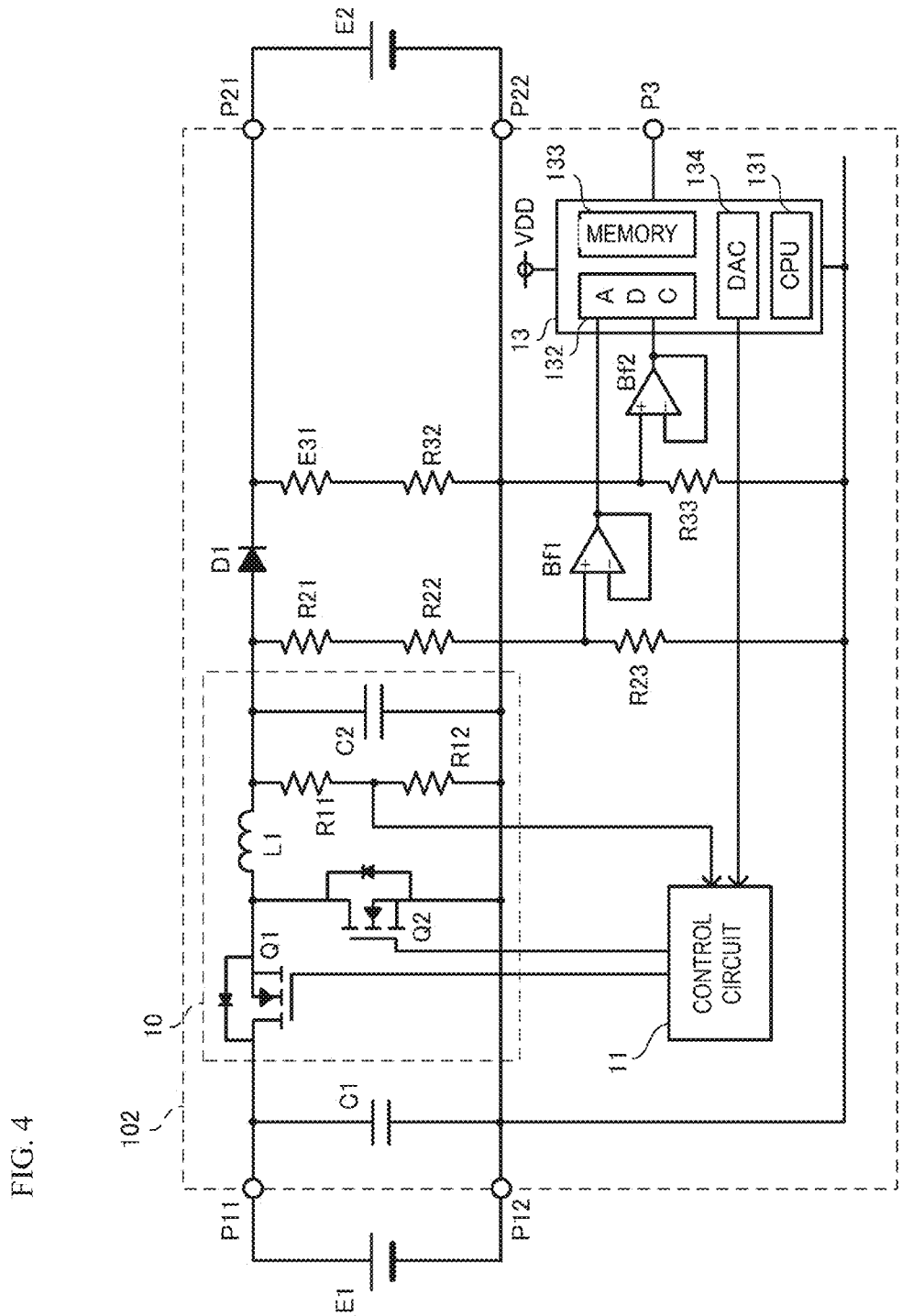
FIG. 4 is a circuit diagram of a switching power supply apparatus according to a second preferred embodiment of the present invention.

FIG. 4 is a circuit diagram of a switching power supply apparatus 102 according to a second preferred embodiment of the present invention.

In the second preferred embodiment, the switching power supply apparatus 102 includes a diode D1 instead of the switching element Q3 shown in FIG. 1. The diode D1 corresponds to the first semiconductor device. An anode of the diode D1 is electrically connected to the step-down converter 10, and a cathode of the diode D1 is electrically connected to the voltage output portion P21. Except for the diode D1, the switching power supply apparatus 102 includes the same or similar circuit configuration as in the first preferred embodiment. The diode D1 significantly reduces or prevents the backflow of a current from the battery E2. In this case, switching control of the diode D1 does not need to be performed.

Third Preferred Embodiment

Figure 5:
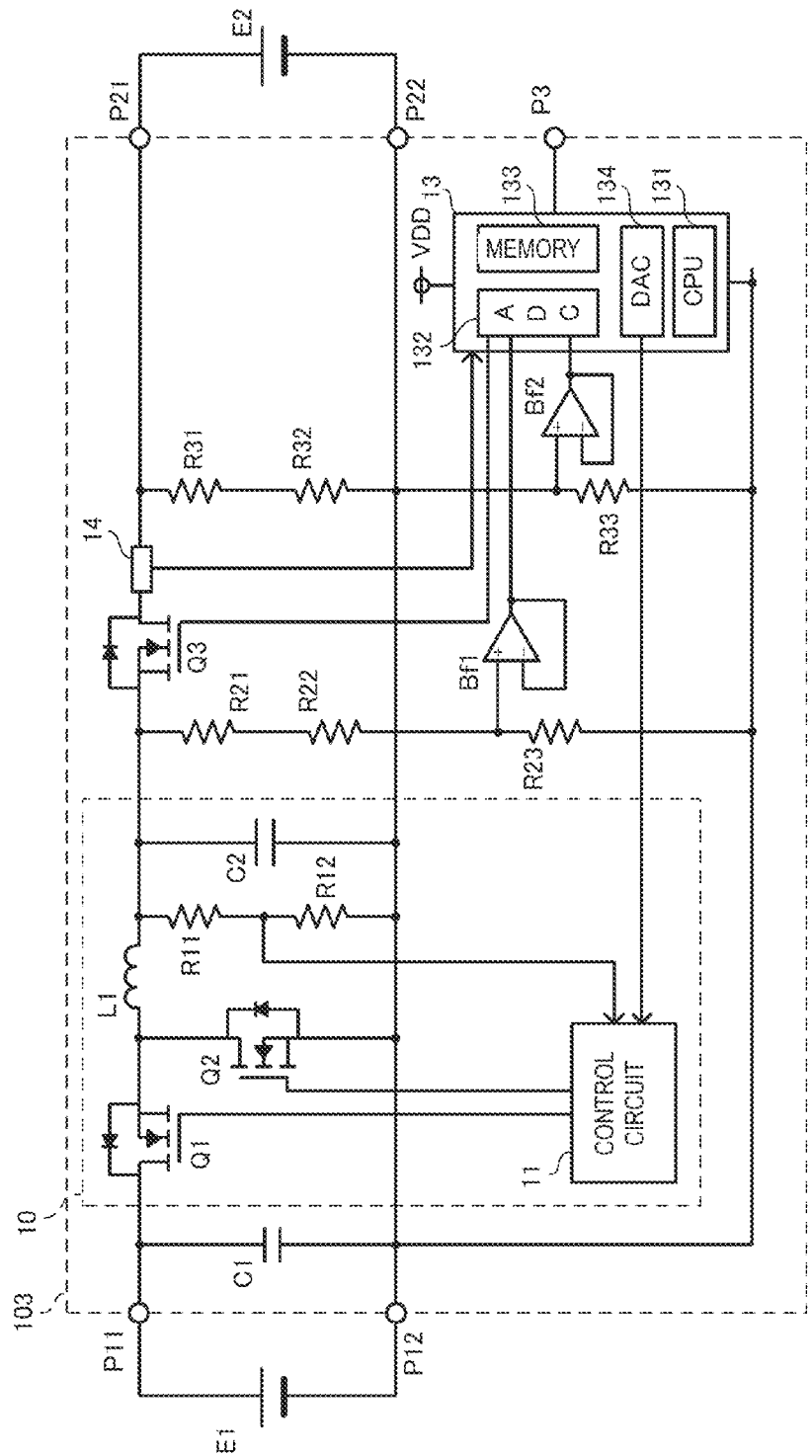
FIG. 5 is a circuit diagram of a switching power supply apparatus according to a third preferred embodiment of the present invention.

FIG. 5 is a circuit diagram of a switching power supply apparatus 103 according to a third preferred embodiment of the present invention.

Similar to the first preferred embodiment, the switching power supply apparatus 103 of the third preferred embodiment includes the step-down converter 10 and the switching element Q3 electrically connected to an output side of the step-down converter 10. In the third preferred embodiment, the connection direction of the switching element Q3 is opposite to that of the first preferred embodiment. More specifically, the source of the switching element Q3 is electrically connected to the step-down converter 10, and the drain of the switching element Q3 is electrically connected to the voltage output portion P21.

The switching power supply apparatus 103 further includes a current detection circuit 14 electrically connected between the switching element Q3 and the voltage output portion P21. The current detection circuit 14 is included to detect the backflow of a current from the battery E2. The current detection circuit 14 is, for example, a resistor and detects the direction of a flowing current according to the potential difference between both ends of the resistor. When the current detection circuit 14 detects the backflow of a current, the microcontroller 13 turns off the switching element Q3. As a result, the backflow of a current is able to be significantly reduced or prevented. By including the switching element Q3 to significantly reduce or prevent the backflow of a current, it is possible to significantly reduce or prevent a conduction loss as compared with a case where the diode D1 according to the third preferred embodiment is included.

Fourth Preferred Embodiment

Figure 6:
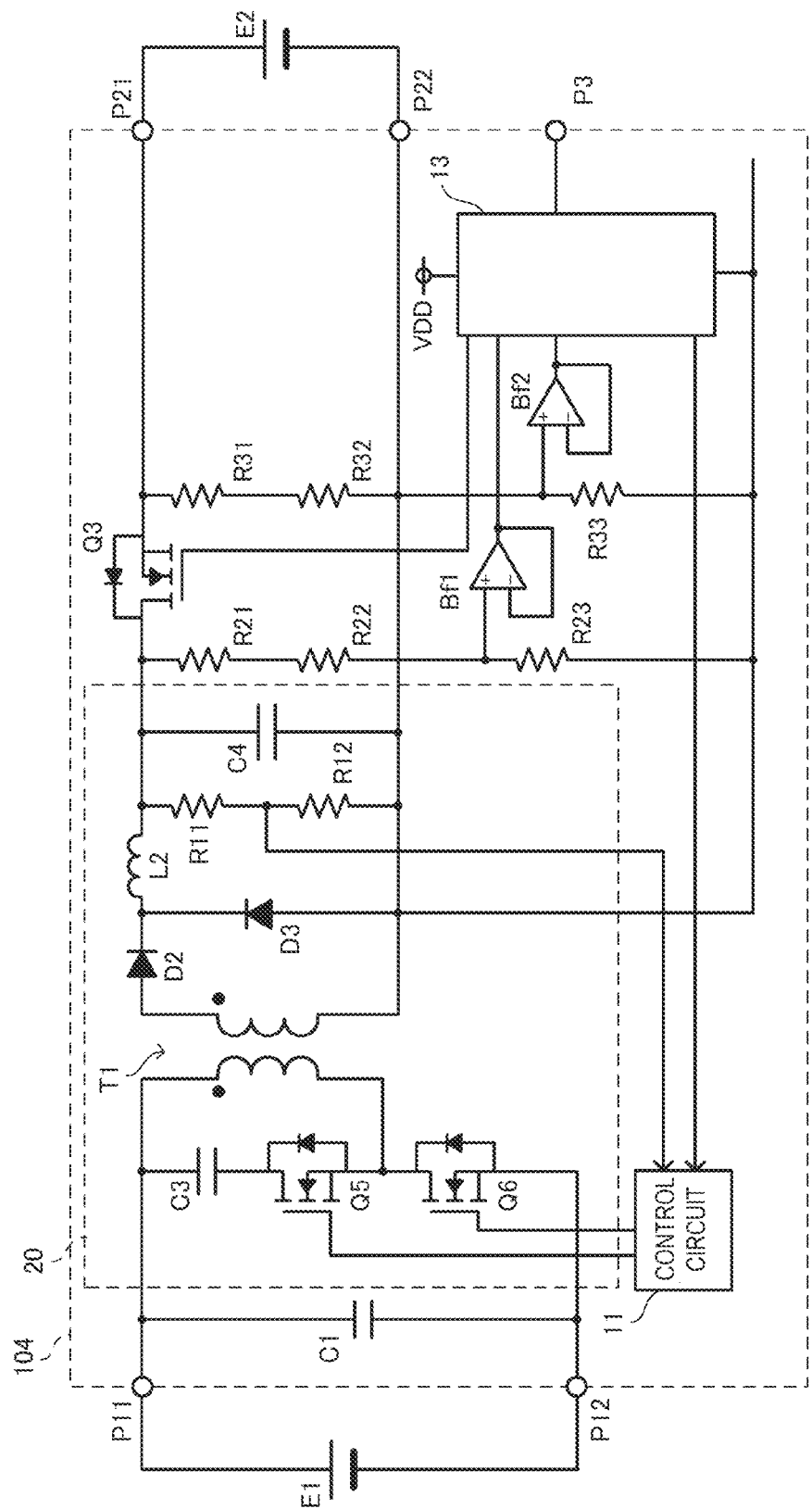
FIG. 6 is a circuit diagram of a switching power supply apparatus according to a fourth preferred embodiment of the present invention.

FIG. 6 is a circuit diagram of a switching power supply apparatus 104 according to a fourth preferred embodiment of the present invention.

In the fourth preferred embodiment, the switching power supply apparatus 104 includes an isolated step-down converter 20. The step-down converter 20 includes capacitors C3 and C4, switching elements Q5 and Q6, a step-down transformer T1, diodes D2 and D3, and an inductor L2.

The control circuit 11 alternately turns on/off the switching elements Q5 and Q6. When the switching element Q6 is in an ON state and the switching element Q5 is in an OFF state, the diode D2 on the secondary side of the step-down transformer T1 is brought into conduction, the inductor L2 is energized, the capacitor C4 is charged, and a voltage is output from the step-down converter 20. When the switching element Q6 is in the OFF state and the switching element Q5 is in the ON state, the diode D3 is brought into conduction, exciting energy is output from the inductor L2, and a voltage stored in the capacitor C4 is output from the step-down converter 20.

Similar to the first preferred embodiment, with this circuit configuration, coefficients calculated for the output-side resistor voltage dividing circuit including the resistors R31, R32, and R33 are able to be applied to the input-side resistor voltage dividing circuit including the resistors R21, R22, and R23 to correct the error of an intermediate bus voltage. Therefore, a measurement terminal that directly measures an intermediate bus voltage is not needed.

Fifth Preferred Embodiment

Figure 7:
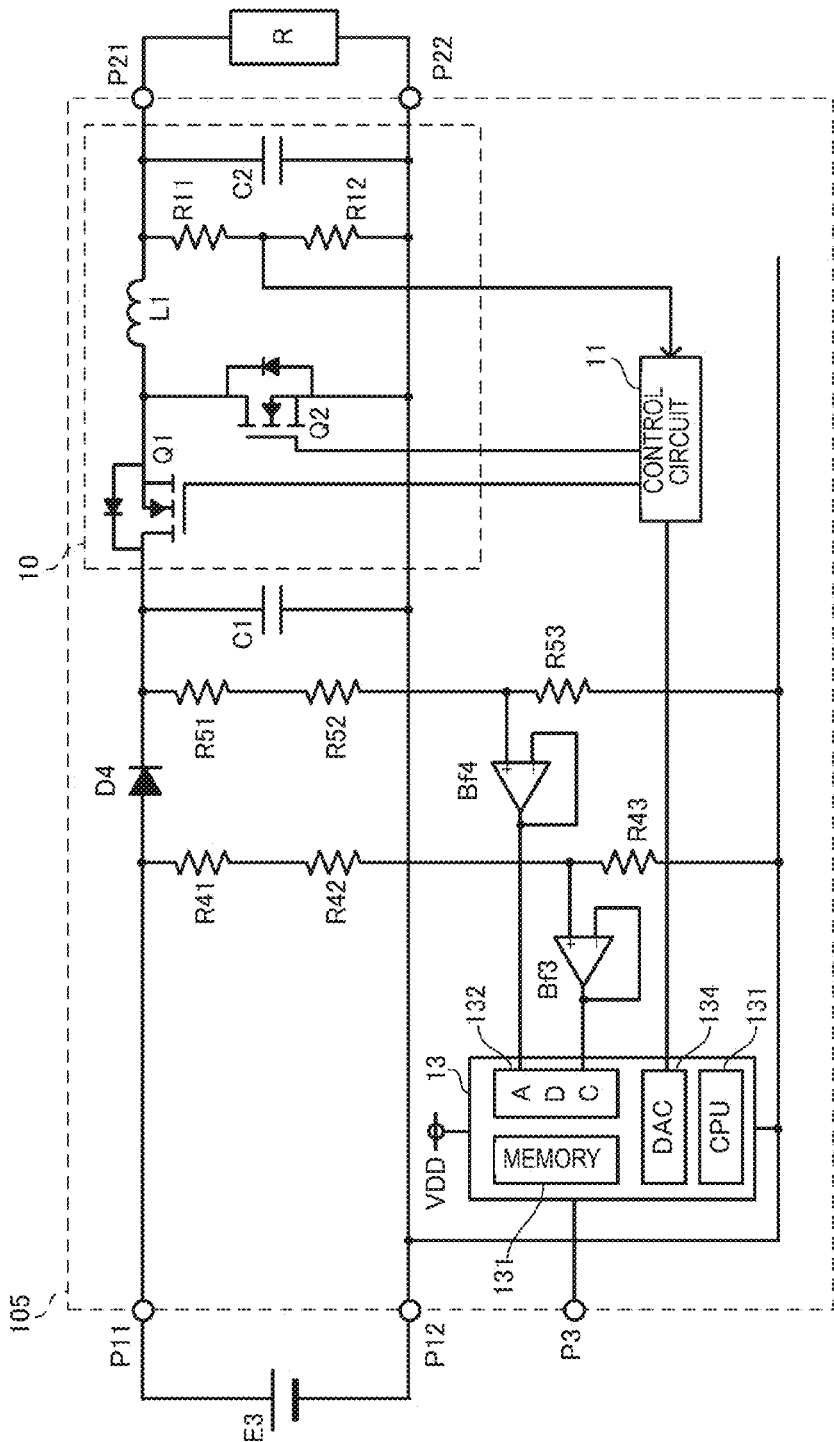
FIG. 7 is a circuit diagram of a switching power supply apparatus according to a fifth preferred embodiment of the present invention.

FIG. 7 is a circuit diagram of a switching power supply apparatus 105 according to a fifth preferred embodiment of the present invention.

In the switching power supply apparatus 105, a battery E3 is electrically connected to the voltage input portions P11 and P12 and a load R is electrically connected to the voltage output portions P21 and P22. The switching power supply apparatus 105 steps down the voltage of the battery E3 and supplies a resultant voltage to the load R.

Similar to the first through fourth preferred embodiments, the switching power supply apparatus 105 includes the step-down converter 10. In the first through fourth preferred embodiments, the step-down converter 10 is electrically connected to the voltage input portions P11 and P12. In the fifth preferred embodiment, the step-down converter 10 is electrically connected to the voltage output portions P21 and p22.

A diode D4 is electrically connected to an input side of the step-down converter 10. The diode D4 corresponds to the first semiconductor device. The anode of the diode D4 is electrically connected to the voltage input portion P11, and the cathode of the diode D4 is electrically connected to the step-down converter 10. The diode D4 significantly reduces or prevents the backflow of a current from the battery E3 when the battery E3 is electrically connected in opposite polarity by mistake.

An input-side resistor voltage dividing circuit is electrically connected to the anode side of the diode D4, and an output-side resistor voltage dividing circuit is electrically connected to the cathode side of the diode D4. The input-side resistor voltage dividing circuit includes resistors R41, R42, and R43, and detects the input voltage of the diode D4.

The output-side resistor voltage dividing circuit includes resistors R51, R52, and R53, and detects the output voltage of the diode D4, which is referred to as an intermediate bus voltage. The intermediate bus voltage corresponds to the first voltage, and the input voltage of the diode D4 corresponds to the second voltage.

The outputs of the input-side resistor voltage dividing circuit and the output-side resistor voltage dividing circuit are electrically connected to the microcontroller 13 via buffers Bf3 and Bf4, respectively. The buffers Bf3 and Bf4 are voltage follower circuits.

The input-side resistor voltage dividing circuit and the output-side resistor voltage dividing circuit are circuits in which the same elements are electrically connected in the same or similar manner. More specifically, the resistors R41 and R51 are elements with the same or similar specifications, the resistors R42 and R52 are elements with the same or similar specifications, and the resistors R43 and R53 are elements with the same or similar specifications. The resistors R41, R42, and R43 are electrically connected in series, and the resistors R51, R52, and R53 are also electrically connected in series.

The elements with the same or similar specifications indicates that the elements include the same or similar breakdown-voltage specifications and the same product specifications, including an error tolerance range and a size, that is, the same product number, in addition to the same or substantially the same nominal resistance. The elements preferably have the same manufacturing lot number, for example.

The resistors R41 and R51 are preferably elements in a single thin-film network resistor, the resistors R42 and R52 are preferably elements in a single thin-film network resistor, and the resistors R43 and R53 are preferably elements in a single thin-film network resistor to further reduce or prevent errors caused by respective elements in the detection circuits, for example.

In the fifth preferred embodiment, coefficients of an expression used to calculate the input voltage of the step-down converter 10 are calculated according to the input voltage of the diode D4 detected by the input-side resistor voltage dividing circuit and the input voltage of the switching power supply apparatus 105 measured at the voltage input portions P11 and P12. The coefficients calculated for the input-side resistor voltage dividing circuit are able to also be applied to the output-side resistor voltage dividing circuit. Similar to the first through fourth preferred embodiments of the present invention, it is possible to correct an error of an intermediate bus voltage without a measurement terminal that directly measures an intermediate bus voltage.

Sixth Preferred Embodiment

Figure 8:
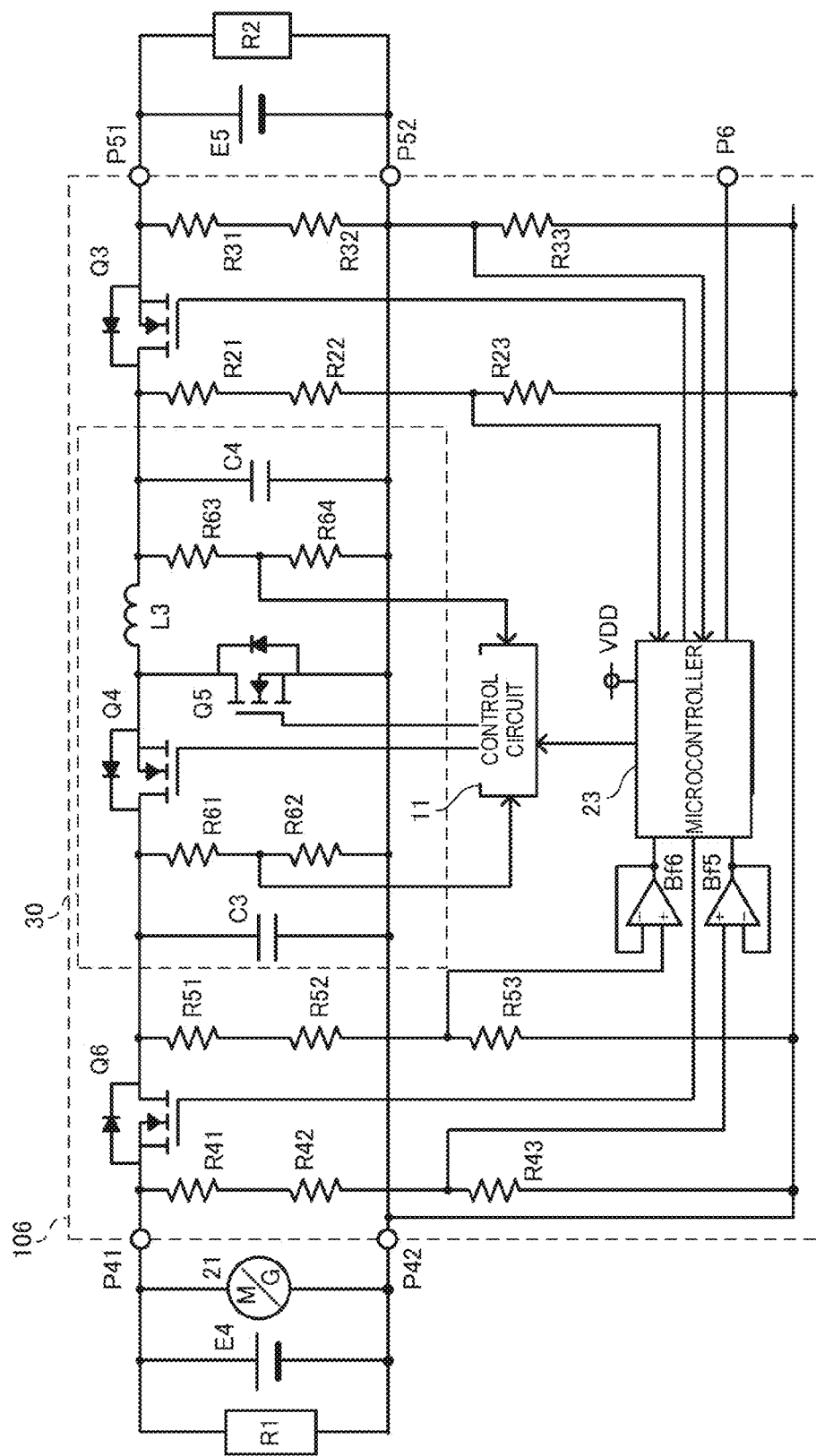
FIG. 8 is a circuit diagram of a switching power supply apparatus according to a sixth preferred embodiment of the present invention.

FIG. 8 is a circuit diagram of a switching power supply apparatus 106 according to a sixth preferred embodiment of the present invention.

In the switching power supply apparatus 106, a battery E4 is electrically connected to voltage input/output portions P41 and P42 and a battery E5 is electrically connected to voltage input/output portions P51 and P52. A load R1 driving with the battery E4 as a power supply and an alternator/motor, which is referred to as a motor 21, are electrically connected to the voltage input/output portions P41 and P42. A load R2 driving with the battery E5 as a power supply is electrically connected to the voltage input/output portions P51 and P52.

The switching power supply apparatus 106 bidirectionally transmits power from the voltage input/output portions P41 and P42 to the voltage input/output portions P51 and P52 or from the voltage input/output portions P51 and P52 to the voltage input/output portions P41 and P42. If power is transmitted from the voltage input/output portions P41 and P42 to the voltage input/output portions P51 and P52, the switching power supply apparatus 106 operates as a step-down chopper circuit. If power is transmitted from the voltage input/output portions P51 and P52 to the voltage input/output portions P41 and P42, the switching power supply apparatus 106 operates as a step-up chopper circuit.

The switching power supply apparatus 106 includes a step-up/down circuit 30. The step-up/down circuit 30 includes capacitors C3 and C4, an inductor L3, and switching elements Q4 and Q5. The step-up/down circuit 30 turns on/off the switching elements Q4 and Q5 to step down a voltage input from the side of the voltage input/output portions P41 and P42 and step up a voltage input from the side of the voltage input/output portions P51 and P52.

The switching power supply apparatus 106 includes a first resistor voltage dividing circuit including resistors R61 and R62 and a second resistor voltage dividing circuit including resistors R63 and R64. The first resistor voltage dividing circuit detects the output voltage of the step-up/down circuit 30 for feedback control at the time of a step-up operation. The second resistor voltage dividing circuit detects the output voltage of the step-up/down circuit 30 for feedback control at the time of a step-down operation. An output voltage detected by each of the first resistor voltage dividing circuit and the second resistor voltage dividing circuit is input into the control circuit 11. The control circuit 11 performs switching control on the switching elements Q4 and Q5 according to a result of voltage detection performed by the resistor voltage dividing circuit. Accordingly, the output voltage of the step-up/down circuit 30 has a predetermined value.

The switching element Q6 is electrically connected between the voltage input/output portions P41 and P42 and the step-up/down circuit 30. The switching element Q6 is a MOS-FET including a source electrically connected to the voltage input/output portion P41 and a drain electrically connected to the step-up/down circuit 30. Similar to the fifth preferred embodiment, the input-side resistor voltage dividing circuit including the resistors R41, R42, and R43 is electrically connected to the source of the switching element Q6 and the output-side resistor voltage dividing circuit including the resistors R51, R52, and R53 is electrically connected to the drain of the switching element Q6. The outputs of the input-side resistor voltage dividing circuit and the output-side resistor voltage dividing circuit are electrically connected to a microcontroller 23 via buffers Bf5 and Bf6, respectively.

The buffers Bf5 and Bf6 are preferably operational amplifiers in a single IC chip that significantly reduce or prevent variations in error caused by the influence of the buffers Bf5 and Bf6, for example.

When the battery E4 is electrically connected in opposite polarity, the switching element Q6 significantly reduces or prevents the backflow of a current from the battery E4.

The switching element Q6 corresponds to a second semiconductor device. The input-side resistor voltage dividing circuit including the R41, R42, and R43 corresponds to a fourth voltage detection circuit. The output-side resistor voltage dividing circuit including the R51, R52, and R53 corresponds to a third voltage detection circuit.

The switching element Q3 is electrically connected between the voltage input/output portions P51 and P52 and the step-up/down circuit 30. The source of the switching element Q3 is electrically connected to the voltage input/output portion P51, and the drain of the switching element Q3 is electrically connected to the step-up/down circuit 30. Similar to the third preferred embodiment, the input-side resistor voltage dividing circuit including the resistors R21, R22, and R23 is electrically connected to the source of the switching element Q3, and the output-side resistor voltage dividing circuit including the resistors R31, R32, and R33 is electrically connected to the drain of the switching element Q3. The outputs of the input-side resistor voltage dividing circuit and the output-side resistor voltage dividing circuit are electrically connected to the microcontroller 23 via buffers (not shown).

The switching element Q3 corresponds to the first semiconductor device. The input-side resistor voltage dividing circuit including the resistors R21, R22, and R23 corresponds to the first voltage detection circuit. The output-side resistor voltage dividing circuit including the resistors R31, R32, and R33 corresponds to the second voltage detection circuit.

Similar to the first through fifth preferred embodiments, the microcontroller 23 operates with the controller drive power supply VDD, and includes a CPU, an AD converter, a memory, and a DA converter. The microcontroller 23 turns on/off the switching elements Q3 and Q6. The microcontroller 23 performs data communication with an external apparatus (not shown) via an external input/output portion P6. This AD converter corresponds to the sampling circuit.

The microcontroller 23 performs the control processing performed by the microcontroller 13 described in the first through fifth preferred embodiments. For example, the microcontroller 23 outputs a voltage detected by the output-side resistor voltage dividing circuit including the resistors R31, R32, and R33 to an external apparatus. A voltage measured by a high-accuracy measurement apparatus at the voltage input/output portions P51 and P52 is input into the external apparatus. The external apparatus compares the voltage measured by the measurement apparatus at the voltage input/output portions P51 and P52 with a voltage detected by the output-side resistor voltage dividing circuit, and calculates coefficients a and b in the expression of y=ax+b described in the first preferred embodiment according to a result of the comparison and predetermined values, for example, the value of the resistor R31. The external apparatus outputs the calculated coefficients a and b to the microcontroller 23 in the switching power supply apparatus 106.

The microcontroller 23 stores the correction values a and b input from the external apparatus in a memory. Upon detecting a voltage, which is referred to as a first intermediate bus voltage, from the input-side resistor voltage dividing circuit including the resistor R21 and the like when the switching power supply apparatus 106 is driven, the microcontroller 23 performs computations to correct the error of the detected first intermediate bus voltage according to the correction values a and b stored in the memory.

The microcontroller 23 similarly outputs a voltage detected by the input-side resistor voltage dividing circuit including the resistors R41, R42, and R43 to the external apparatus. A voltage measured by a high-accuracy measurement apparatus at the voltage input/output portions P41 and P42 is input into the external apparatus. The external apparatus compares the voltage measured by the measurement apparatus at the voltage input/output portions P51 and P52 with a voltage detected by the input-side resistor voltage dividing circuit, and calculates the coefficients a and b in the above-described expression according to a result of the comparison and predetermined values, for example, the value of the resistor R41. The external apparatus outputs the calculated coefficients a and b to the microcontroller 23 in the switching power supply apparatus 106.

The microcontroller 23 stores the correction values a and b input from the external apparatus in a memory. Upon detecting a voltage, which is referred to as a second intermediate bus voltage, from the output-side resistor voltage dividing circuit including the resistor R51 and the like when the switching power supply apparatus 106 is driven, the microcontroller 23 performs computations to correct the error of the detected second intermediate bus voltage according to the correction values a and b stored in the memory.

As described above, the switching power supply apparatus 106 according to the sixth preferred embodiment is able to correct the errors of measurement values of the first intermediate bus voltage and the second intermediate bus voltage without a measurement terminal that directly measures the first intermediate bus voltage and the second intermediate bus voltage.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
a converter that converts an input voltage input to a voltage input terminal into a predetermined voltage by turning a switching element on and off;
a first semiconductor device including switching characteristics and electrically connected in series to an input or an output terminal of the converter;
a first voltage detection circuit that detects a first voltage at a first end of the first semiconductor device electrically connected to the converter;
a second voltage detection circuit that detects a second voltage at a second end of the first semiconductor device;
a sampling circuit that compares a detection signal detected by each of the first voltage detection circuit and the second voltage detection circuit with a reference voltage;
a voltage calculation processor that calculates a measurement value of each of the first voltage and the second voltage according to voltage data generated by the sampling circuit in a first expression;
a memory that stores a first coefficient of the first expression; and
a communication circuit that transmits a measurement value of each of the first voltage and the second voltage calculated by the voltage calculation processor to an external apparatus and receives the first coefficient from the external apparatus; wherein
the first voltage detection circuit and the second voltage detection circuit include same or similar structures and include elements with same or similar specifications;
the sampling circuit applies a same or substantially a same reference voltage to sample detection signals detected by the first voltage detection circuit and the second voltage detection circuit; and
a same first expression is used to calculate measurement values of the first voltage and the second voltage and a same or substantially a same first coefficient is included in the first expression.

2. The switching power supply apparatus according to claim 1, wherein the first voltage detection circuit and the second voltage detection circuit are resistor voltage dividing circuits.

3. The switching power supply apparatus according to claim 2, wherein respective resistance elements in the resistor voltage dividing circuits have a same manufacturing lot number.

4. The switching power supply apparatus according to claim 2, wherein respective resistance elements in the resistor voltage dividing circuits are elements in a single thin-film network resistor.

5. The switching power supply apparatus according to claim 1, wherein
the first voltage detection circuit includes a first buffer at an output of the first voltage detection circuit; and
the second voltage detection circuit includes a second buffer at an output of the second voltage detection circuit.

6. The switching power supply apparatus according to claim 5, wherein the first buffer and the second buffer are circuits including same or similar structures and include operational amplifiers, and the operational amplifiers are provided in a single chip.

7. The switching power supply apparatus according to claim 1, wherein the first semiconductor device is a MOSFET.

8. The switching power supply apparatus according to claim 1, wherein the first semiconductor device is a diode.

9. The switching power supply apparatus according to claim 1, further comprising:
a second semiconductor device including switching characteristics and electrically connected to the input terminal of the converter;
a third voltage detection circuit that detects a third voltage at a first end of the second semiconductor device electrically connected to the converter; and
a fourth voltage detection circuit that detects a fourth voltage at a second end of the second semiconductor device; wherein
the sampling circuit compares a detection signal detected by each of the third voltage detection circuit and the fourth voltage detection circuit with a reference voltage;
the voltage calculation processor calculates a measurement value of each of the third voltage and the fourth voltage according to voltage data generated by the sampling circuit in a second expression;
the memory stores a second coefficient of the second expression; and
the communication circuit transmits a measurement value of each of the third voltage and the fourth voltage calculated by the voltage calculation processor to an external apparatus and receives the second coefficient from the external apparatus; wherein
the first semiconductor device is electrically connected to the output terminal of the converter;
the third voltage detection circuit and the fourth voltage detection circuit include same or similar structures and include elements with same or similar specifications;
the sampling circuit applies a same or substantially a same reference voltage to sample detection signals detected by the third voltage detection circuit and the fourth voltage detection circuit; and
a same second expression is applied to calculate of measurement values of the third voltage and the fourth voltage and a same or substantially a same second coefficient is included in the second expression.

10. The switching power supply apparatus according to claim 9, wherein the third voltage detection circuit and the fourth voltage detection circuit are resistor voltage dividing circuits.

11. The switching power supply apparatus according to claim 10, wherein respective resistance elements in the resistor voltage dividing circuits have a same manufacturing lot number.

12. The switching power supply apparatus according to claim 10, wherein respective resistance elements in the resistor voltage dividing circuits are elements in a single thin-film network resistor.

13. The switching power supply apparatus according to claim 9, wherein
the third voltage detection circuit includes a third buffer at an output of the third voltage detection circuit; and
the fourth voltage detection circuit includes a fourth buffer at an output of the fourth voltage detection circuit.

14. The switching power supply apparatus according to claim 13, wherein the third buffer and the fourth buffer are circuits including same or similar structures and include operational amplifiers, and the operational amplifiers are provided in a single chip.

15. The switching power supply apparatus according to claim 9, wherein the second semiconductor device is a MOS-FET.

16. The switching power supply apparatus according to claim 9, wherein the second semiconductor device is a diode.

17. The switching power supply apparatus according to claim 1, wherein the converter is a step-down converter that includes at least one switching element, at least one inductor, and at least one capacitor.

18. The switching power supply apparatus according to claim 7, wherein:
one of a drain and a source of the first semiconductor device is electrically connected to the converter; and
the other of the drain and the source of the first semiconductor device are electrically connected to a voltage output of the switching power supply apparatus.

19. The switching power supply apparatus according to claim 1, wherein the first semiconductor device is controlled to turn off if a voltage detected by the first voltage detection circuit exceeds a predetermined threshold value.

20. The switching power supply apparatus according to claim 5, wherein the first buffer and the second buffer are voltage follower circuits.

* * * * *